US007987372B2

(12) United States Patent
Mani

(10) Patent No.: US 7,987,372 B2
(45) Date of Patent: Jul. 26, 2011

(54) METHOD FOR MANAGING THE ACCESS TO A MEMORY, BY USING PASSWORDS

(75) Inventor: Christophe Mani, Cavaillon (FR)

(73) Assignee: STMicroelectronics SA, Montrouge (FR)

(*) Notice: Subject to any disclaimer, the term of this patent is extended or adjusted under 35 U.S.C. 154(b) by 1093 days.

(21) Appl. No.: 11/610,610

(22) Filed: Dec. 14, 2006

(65) Prior Publication Data

US 2007/0157029 A1  Jul. 5, 2007

(30) Foreign Application Priority Data

Dec. 16, 2005 (FR) .................................... 05 12782

(51) Int. Cl.
*H04L 29/00* (2006.01)
(52) U.S. Cl. ............... 713/185; 726/2; 726/4; 726/9; 713/182; 713/183; 713/161; 713/168
(58) Field of Classification Search ............... 713/161, 713/168, 182, 185, 183; 726/2, 4, 9
See application file for complete search history.

(56) References Cited

U.S. PATENT DOCUMENTS

| | | | |
|---|---|---|---|
| 5,469,564 A | 11/1995 | Junya | 395/188.01 |
| 5,796,943 A * | 8/1998 | Fujioka | 726/19 |
| 6,563,600 B1 * | 5/2003 | Young | 358/1.5 |
| 2004/0078511 A1 * | 4/2004 | Vogt et al. | 711/103 |
| 2005/0015601 A1 * | 1/2005 | Tabi | 713/182 |
| 2005/0271156 A1 * | 12/2005 | Nakano | 375/265 |

FOREIGN PATENT DOCUMENTS

GB       2 248 324 A       4/1992

* cited by examiner

*Primary Examiner* — Vivek Srivastava
*Assistant Examiner* — Anthony Brown
(74) *Attorney, Agent, or Firm* — Lisa K. Jorgenson; Jeremiah J. Baunach; Seed IP Law Group PLLC

(57) ABSTRACT

A method for managing the access to a memory space shareable by several users, by using passwords, comprises: defining a maximum number of passwords, providing a password storage zone, dividing the shareable memory space into a plurality of blocks greater in number than the maximum number of passwords, providing in each block a parameterization field for parameterizing the protection of the block, providing in each parameterization field a binary index smaller in size than a password and designating a password assigned to the protection of the block, and allocating, to each block, access rights requiring a password to be presented corresponding to the password designated by the index present in the block parameterization field. Application is provided particularly but not exclusively to multi-user integrated circuits.

35 Claims, 4 Drawing Sheets

METHOD FOR MANAGING THE ACCESS TO A MEMORY, BY USING PASSWORDS

TECHNICAL FIELD

The present disclosure generally relates to a method for managing the access to a memory by using passwords, and an integrated circuit implementing this method.

The present disclosure particularly but not exclusively relates to integrated circuits with a "multi-user"-type memory, such as the contactless integrated circuits present in tags.

BACKGROUND INFORMATION

Contactless tags are often used as a product identification and traceability means. Within this context, different parties can be required to write or read data saved in the tags. For example, after affixing a contactless tag on the product he has just manufactured, a manufacturer writes in the memory of the integrated circuit of the tag the serial number of the product, the model and the type of product, its manufacturing date, etc. The distributor of the same product then writes data of his own in the tag, for example the purchase date, the trade references of the product, the destination of the product, etc. Finally, the retailer may also wish to write data of his own in the tag, for example the date of receipt of the product, the purchase price and the retail price of the product, etc. Therefore, three different users must share the memory space of the integrated circuit.

So that the data written by each user are protected against access attempts by unauthorized third parties, provision is usually made for a password-based protection system. Many contactless integrated circuits thus have a single password that must be presented before each access to the memory. However, to avoid the same password being shared by several users, one well-known method also involves dividing the memory space into several sectors which can each be protected by a determined password.

FIG. 1 schematically shows the structure of an RFID-type (Radio Frequency Identification) contactless integrated circuit IC1 using several passwords. The integrated circuit comprises a contactless communication interface circuit ICT, a control circuit CCT1 and an electrically erasable and programmable memory MEM1. The interface circuit ICT is linked to an antenna circuit ACT for contactlessly receiving or sending data. The control circuit CCT1 receives, via the interface circuit ICT, read or write commands CMD for writing or reading the memory, and returns responses RSP via the circuit ICT. The memory MEM1 comprises a user memory area UMEM and a system memory area SMEM, represented by a hatched area. The system area generally comprises data used by the control circuit CCT1 to implement the contactless communication protocol.

The user memory area UMEM is split into several sectors of the same size, for example three sectors S1, S2, S3 which can generally each receive from a few tens to a few hundred bytes. In each sector S1, S2, S3 there is a reserved location receiving a password, respectively pw1, pw2, pw3.

Each memory is accessed, for example for reading or writing a word, by sending to the integrated circuit a read or write command comprising the address of the word (including the address of the sector in which the word is located) and the password of the sector. Before executing the command, the circuit CCT1 reads the password in the sector and compares it with the password present in the command. If the result of the comparison is positive, the command is executed. In the opposite case, the circuit CCT1 returns an error code.

Upon commissioning the integrated circuit IC1, the memory area UMEM is blank and the passwords are equal to a default value, generally 0. The first user chooses one of the sectors, generally the first sector S1, writes his password and then the data of the application in it. The second user does the same with the sector S2 and the third user does the same with the last sector S3. Each user thus has a reserved memory space protected by a password and can access it at will to read or write data.

However, this method for sharing the memory space has various disadvantages. Firstly, partitioning the memory space into sectors of the same size does not enable the memory space to be optimally occupied, due to the fact that each user does not necessarily have the same number of data to write. Thus, one user may only use a small portion of the sector he was allocated, while another user may be restricted by the lack of space of the sector he is allocated. In this case, the memory space unused by the first user cannot be used by the second user, hence a significant waste of memory space.

Furthermore, a user (for example, the manufacturer) may want another user (for example, the wholesaler) to be able to selectively read certain data he has saved in the memory, but not all the data.

To meet this need, it is possible to subdivide the user memory space UMEM into smaller sectors that are greater in number, for example fifteen sectors instead of three. Thus, if the needs of the first user are slight in terms of memory space, the first user will only use a small number of sectors, the rest of the memory space being made available to the other users. Moreover, the first user can reveal the passwords of certain sectors to the other users, so that the latter can read these sectors.

However, this solution has a major disadvantage: when the number of sectors increases, the number of passwords increases proportionately as well as the percentage of the memory space occupied by the passwords that may each include several bytes.

BRIEF SUMMARY

Thus, one embodiment of the present invention provides a method enabling several users to share a memory without increasing, in an unacceptable manner, the memory space occupied by passwords.

One embodiment of the present invention provides a method for managing the access rights to a shareable memory space that is very flexible to use and particularly enables read- and write-access rights to be managed distinctly.

At least one embodiment of the present invention provides a method for managing the access to a memory space shareable by several users, by using a plurality of passwords, comprising: defining a maximum number of passwords, providing a password storage zone, dividing the shareable memory space into a plurality of blocks greater in number than the maximum number of passwords, providing, in each block, a parameterization field for parameterizing the protection of the block, providing, in each parameterization field, a binary index smaller in size than the password and designating a password assigned to the protection of the block, a same password possibly being used to protect several blocks, and allocating, to each block, access rights requiring a password to be presented that corresponds to the password designated by the index present in the block parameterization field.

According to one embodiment, the method comprises providing, in the parameterization field of each block, a first binary parameter defining the access rights to the block after presentation of a password corresponding to the password designated by the index, distinguishing between read- and write-access rights to the block.

According to one embodiment, the first binary parameter also defines access rights to the block without presentation of the password.

According to one embodiment, the method comprises providing, in the parameterization field of each block, a second binary parameter having a first value that authorizes the read- and write-access to the block whatever the value of the first binary parameter, and a second value that validates the effects of the first binary parameter on the access rights to the block.

According to one embodiment, a value of the index means that no password is allocated to the block.

According to one embodiment, the block is write-locked when the second binary parameter has the second value and when the index indicates that no password is allocated to the block.

According to one embodiment, the total size of the parameterization field of a block is smaller than the size of a password.

According to one embodiment, the write-access rights given to the parameterization field of a block are identical to the write-access rights that the parameterization field gives to the block in which it is situated.

According to one embodiment, the password storage zone comprises a plurality of password blocks each comprising a password field and a parameterization field defining the access rights to the password block.

According to one embodiment, the password storage zone is only accessible by using specific write commands for writing the passwords.

According to one embodiment, the blocks of the shareable memory space are accessed by session, the opening of a session comprising presenting, by the user, a user password, at least one comparing the password presented with at least one password present in the password storage zone, and storing the result of the comparison, at least if this result is positive.

According to one embodiment, a session is interrupted when a user presents a new password or when the memory space is switched off.

According to one embodiment, the storing of the result of the comparison of the passwords comprises loading into a reference register a binary value equal to an index designating a password block, and the processing of a request for read- or write-access to a block of the shareable memory space comprises comparing the index present in the parameterization field of the targeted block with the content of the reference register, the password of the block targeted by the request for access being considered to have been validly presented if the result of the comparison is positive.

One embodiment of the present invention also relates to an integrated circuit comprising a memory and a control circuit for controlling the access to the memory, the memory comprising a memory space shareable by several users, the control circuit comprising means for comparing passwords supplied by users and passwords present in the memory, wherein the memory comprises a password storage zone defining a maximum number of passwords, the memory space is divided into a plurality of blocks greater in number than the maximum number of passwords, each block comprises a parameterization field for parameterizing the protection of the block, each parameterization field of a block comprises a binary index smaller in size than a password and designating a password assigned to the protection of the block, a same password possibly being used to protect several blocks, and the control circuit is arranged for allocating, to each block, access rights requiring a password to be presented that corresponds to the password designated by the index present in the block parameterization field.

According to one embodiment, the parameterization field of each block further comprises a first binary parameter defining the access rights to the block after presentation of a password corresponding to the password designated by the index, and distinguishing between the read- and write-access rights to the block.

According to one embodiment, the first binary parameter also defines access rights to the block without presentation of any password.

According to one embodiment, the parameterization field of each block comprises a second binary parameter having a first value that authorizes the read- and write-access to the block whatever the value of the first binary parameter, and a second value that validates the effects of the first binary parameter on the access rights to the block.

According to one embodiment, the index of each block can be taken to a value meaning that no password is allocated to the block.

According to one embodiment, a block is write-locked when the second binary parameter has the second value and when the index indicates that no password is allocated to the block.

According to one embodiment, the total size of the parameterization field of a block is smaller than the size of a password.

According to one embodiment, the write-access rights of the parameterization field of a block are identical to the write-access rights that the parameterization field gives to the block in which it is situated.

According to one embodiment, the password storage zone comprises a plurality of blocks each receiving a password and each comprising a parameterization field defining the access rights to the block.

According to one embodiment, the password storage zone is arranged in a system area of the memory, and is only accessible to the users by using specific write commands for writing the passwords.

According to one embodiment, the blocks of the shareable memory space are accessed by session, the control circuit being arranged for executing a command for presenting a user password, and, if the user password is identical to a password present in the password storage zone, authorizing the user to access the blocks the index of which designates this password for the entire duration of a session, without requiring the password to be presented at each access to the blocks.

According to one embodiment, the control circuit is arranged for interrupting a session when a user presents a new password or when the integrated circuit is switched off.

According to one embodiment, the control circuit is arranged for, upon receiving the command for presenting a password, comparing the user password with a password present in a password block and, if the result of the comparison is positive, loading into a reference register a binary value equal to an index designating the password block, and upon receiving a read or write command for reading or writing a block of the shareable memory space, comparing the index present in the block targeted by the read or write command with the content of the reference register, and considering that the password of the block targeted by the command has been validly presented if the result of the comparison is positive.

BRIEF DESCRIPTION OF THE SEVERAL VIEWS OF THE DRAWINGS

These and other features shall be presented in greater detail in the following description of one or more embodiments of the method of the present invention and of one or more embodiments of an integrated circuit implementing the method(s), given in relation with, but not limited to the following figures, in which.

DETAILED DESCRIPTION

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
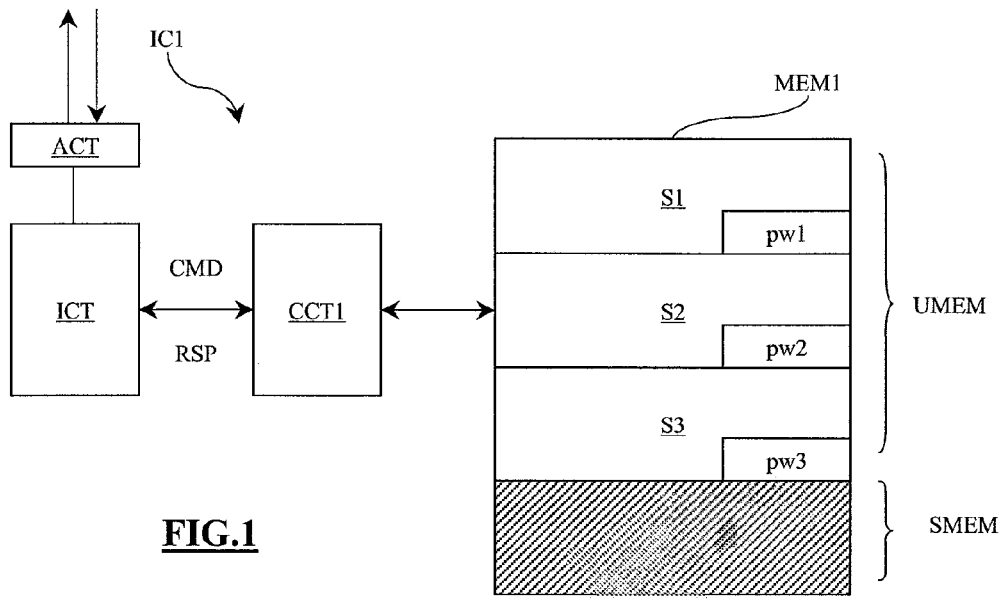
FIG. 1 described above schematically represents the structure of a contactless integrated circuit having a shareable memory, FIG. 2 schematically represents the structure of a contactless integrated circuit according to an embodiment of the present invention, having a shareable memory and implementing an embodiment of the method of the present invention.
Figure 2:
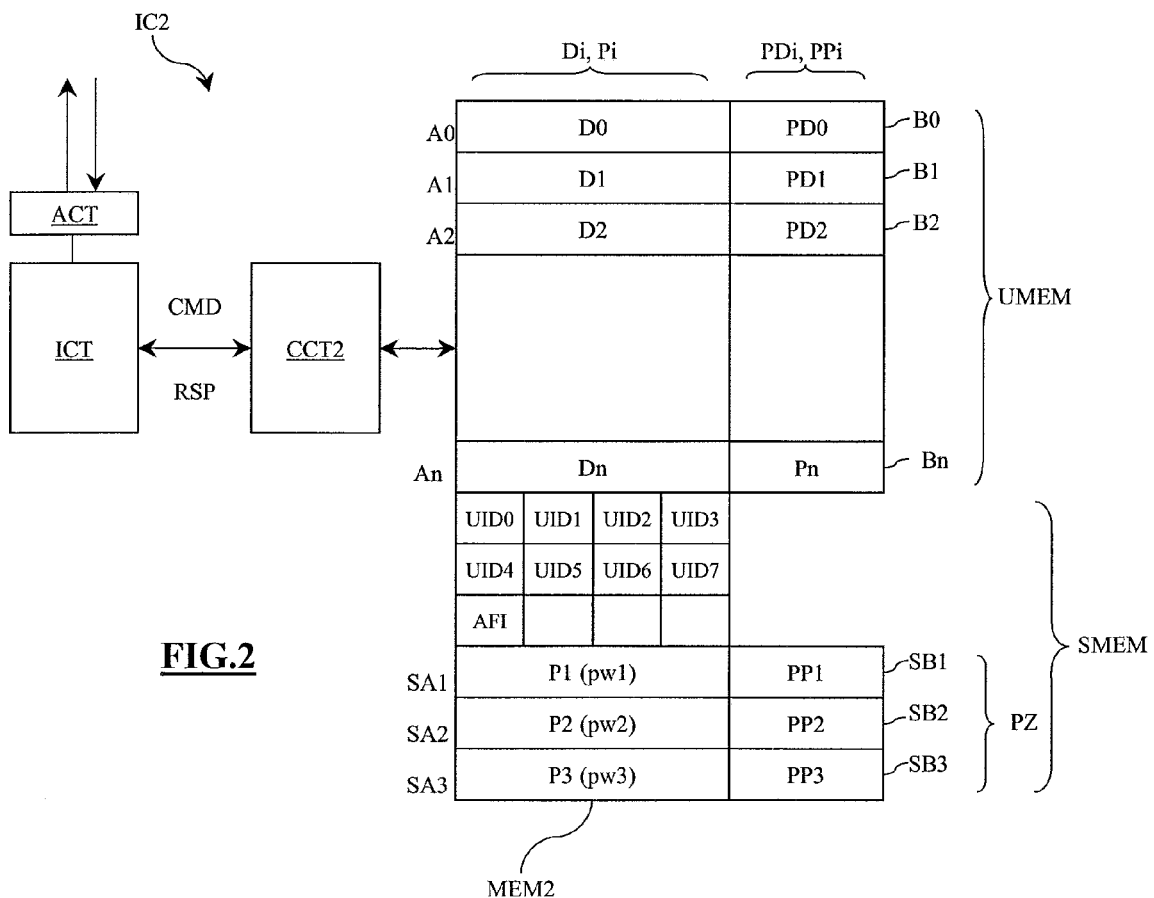

FIG. 2 schematically represents the structure of a contactless integrated circuit IC2 according to one embodiment of the present invention. In an embodiment, the integrated circuit IC2 comprises a contactless communication interface circuit ICT, a control circuit CCT2 and an electrically erasable and programmable memory MEM2. The interface circuit ICT is linked to an antenna circuit ACT of the inductive coupling type (comprising an antenna coil) or of the UHF type (comprising a dipole antenna) for receiving data by inductive coupling or by electric field modulation, and sending data by load modulation or by modulating the reflection coefficient of the antenna circuit ("backscattering"). The control circuit CCT2 is a hard-wired logic or microprocessor circuit, and the memory MEM2 is of the EEPROM or FLASH type in some embodiments.

The format of the commands received and of the responses sent via the circuit ICT, and the contactless communication protocol used, are determined by a standard, for example the ISO 15693 standard, the ISO 14443 standard, the ISO 18000-3 standard, etc. or several standards if the integrated circuit is of the multiprotocol type.

In a manner classic in itself, the memory MEM2 comprises a user memory area UMEM and a system memory area SMEM. The system area SMEM comprises data used by the circuit CCT2 to implement the communication protocol. These data are for example the single identifier UID used by various anti-collision protocols, here coded on 8 bytes UID0 to UID7, a parameter AFI and a parameter DSFID of 1 byte each, provided for by the ISO 15693 and ISO 18000-3 standards.

According to one embodiment of the present invention, and as described by Table 1 below, the user memory area UMEM is divided into a plurality of data blocks of the same size, here n+1 blocks B0, B1, B2 . . . Bn. Each block Bi (B0, B1, . . . Bn) is designated by an address Ai (A0, A1, . . . An) and comprises a data field Di (D0, D1, . . . Dn) and a field PDi (PD0, PD1, . . . PDn) enabling the read- and write-protection of the block to be parameterized.

The data field Di of each block Bi here has an example size of 4 bytes, i.e., 32 bits, and the example parameterization field PDi here contains 5 useful bits. For purely technical reasons arising during the design of the memory, the size of the parameterization field PDi can be greater than 5 bits, and be one byte for example. The unused bits of the parameterization field, reserved for future use, will here be considered inexistent, for the sake of simplicity.

The memory MEM2 also comprises a password zone PZ for storing passwords, which is arranged here in the system memory area SMEM. The zone PZ is divided into data blocks SBi of the same size as the blocks Bi of the memory area UMEM and here comprises three blocks SB1, SB2, SB3 or "password blocks". Like the blocks Bi, each block SBi (SB1, SB2, SB3) comprises a data field Pi (P1, P2, P3) and a parameterization field PPi (PP1, PP2, PP3) for the protection of the block to be parameterized. The data field Pi is a password field and receives a password pwi (pw1, pw2, pw3). As the fields Pi of the blocks SBi are here of the same size as the fields Di of the blocks Bi of the memory area UMEM, the passwords are coded on 32 bits, for example.

The content of the parameterization fields PDi and PPi is described by Table 2 below. The fields PDi and PPi each comprise an index IDX coded on two bits b4, b3, a parameter PR coded on two bits b2, b1, and a lock bit b0. This content is a sort of coding defining access rights to the data blocks or to the password blocks, to which the control circuit CCT2 refers when a user sends the integrated circuit a read or write command for reading or writing a block, to determine whether or not this command can be executed.

If different from 0, the index IDX of the data blocks Bi designates a password block SBi, in accordance with the coding convention described by Table 3 below. The password pwi present in the field Pi of the password block SBi designated by the index IDX is therefore considered to be the password allocated to the data block Bi to manage the access rights to this block. If different from "00", the index IDX of the password blocks SBi also designates a password block SBi, the user being given the choice of making the index of a password block designate the password block in which it is located, or another password block.

TABLE 1

Organization of the Memory MEM2

| User Area | | Blocks | Data fields Di and Pi (32 bits) | | | | Parameterization fields PDi and PPi (8 bits) |
|---|---|---|---|---|---|---|---|
| UMEM | | B0 | | D0 | | | PD0 |
| | | B1 | | D1 | | | PD1 |
| | | B2 | | D2 | | | PD2 |
| | | ... | | ... | | | |
| | | Bn | | Dn | | | PDn |
| SMEM | | | UID0 | UID1 | UID2 | UID3 | (unused) |
| | | | UID4 | UID5 | UID6 | UID7 | (unused) |
| | | | AFI | DSFID | | | (unused) |
| | PZ | SB1 | | P1 (pw1) | | | PP1 |
| | | SB2 | | P2 (pw2) | | | PP2 |
| | | SB3 | | P3 (pw3) | | | PP3 |

TABLE 2

Format of the Fields PDi (PD0 to PDn) and PPi (PP1 to PP3)

| index IDX | | parameter PR | | lock bit |
|---|---|---|---|---|
| b4 | b3 | b2 | B1 | b0 |

TABLE 3

Coding of the Index IDX

| IDX | Password |
|---|---|
| 00 | the block is not protected by a password |
| 01 | the block is protected by the password pw1 present in the field P1 of the block SB1 |
| 10 | the block is protected by the password pw2 present in the field P2 of the block SB2 |
| 11 | the block is protected by the password pw3 present in the field P3 of the block SB3 |

The parameter PR defines access rights to the block in the manner described by Table 4 below, by distinguishing firstly between the read-access rights and the write-access rights, and secondly between the access rights given to a user having presented a valid password and the access rights given to a user not having presented the password allocated to the block or having presented an invalid password (a password is valid if it is equal to the password allocated to the block, i.e., the password designated by the index IDX present in the block).

TABLE 4

Coding of the Fields PDi (PD0 to PDn) and PPi (PP1 to PP3)

| | | | Password not presented | | Password presented | |
|---|---|---|---|---|---|---|
| b0 | b2 b1 (PR) | b4 b3 (IDX) | Read-accessible | Write-accessible | Read-accessible | Write-accessible |
| 0 | xx | xx | YES | YES | YES | YES |
| 1 | xx | 00 | YES | NO | YES | NO |
| 1 | 00 | 01, 10, 11 | YES | NO | YES | YES |
| 1 | 01 | 01, 10, 11 | YES | YES | YES | YES |
| 1 | 10 | 01, 10, 11 | NO | NO | YES | YES |
| 1 | 11 | 01, 10, 11 | NO | NO | YES | NO |

The write protection defined by the parameterization field PDi of a data block Bi or by the parameterization field PPi of a password block SBi, applies here to the entire block in question, and therefore also relates to the parameterization field PDi or PPi itself. Thus, a data block or a password block that is write-locked with or without password (PR=11) can no longer be made write-accessible, including by the user having the password.

Similarly, when the lock bit b0 of a block has been set to 1 whereas the index IDX of the block indicates that no password has been allocated to the block (IDX=00, Cf. Table 3 and Table 4), the block is definitively write-locked but remains read-accessible. No password can therefore be subsequently allocated to this block. On the other hand, if a password has been allocated to the block (IDX=01, 10 or 11) or is allocated to the block when the bit b0 is set to 1, the setting to 1 of the bit b0 enables the access right allocation rule defined by the parameter PR to be validated.

However, it is preferred to keep the possibility of reading the parameterization fields PDi of the data blocks Bi, including when the corresponding data fields Di are not read-accessible. Thus, when b2 b1 b0=111(last line of Table 4) or b2 b1 b0=101(penultimate line of Table 4), the parameterization field PDi remains read-accessible to the authenticated or non-authenticated user.

Generally speaking, one embodiment of the present invention enables the number of passwords to be reduced while increasing the fineness of the breakdown of the user memory UMEM, and while offering very flexible management of the access rights. Thanks to an embodiment of the present invention, each password pwi can be used to protect any one of the data blocks Bi or any one of the passwords blocks Pi. In addition, the parameter PR enables different read and write rights to be defined and different rights for the user having the password and the user who does not have the password.

Each user can therefore use one or more passwords and grant the next user read rights to certain blocks by giving him one of the passwords used. When the integrated circuit is commissioned, the parameterization fields PDi of the data blocks Bi and the parameterization fields PPi of the password blocks SBi are all on 0 by default, as are the password fields Pi. Thus, the first user can occupy at will one or more data blocks and parameterize the protection of these blocks. The user can also write his password(s) in the password blocks and define the access rights to the passwords, particularly lock the password blocks so that no one can subsequently change the passwords, including himself.

Moreover, as the protection of the password blocks SBi can be indexed on passwords present in other password blocks, the user can decide to protect a secondary password by means of a main password (for example an administrator password) present in another password block. The user can then supply a third party with the secondary password without revealing the main password, without running the risk of the third party changing the secondary password and without being forced to write-lock the secondary password for the authenticated user, to reserve the possibility of subsequently changing it.

As the size of the data block parameterization fields (here 5 bits) is clearly smaller than the size of the passwords (here 32 bits), and as the number of passwords (here 3) is clearly smaller than the number of data blocks (for example n+1=256), the method for managing the access rights according to one embodiment of the present invention limits the memory space occupied by the passwords while offering a very fine granularity in the breakdown of the memory (breakdown on a block-by-block basis) enabling the filling of the user memory area UMEM to be optimized. For example, a first user having used the first password block SB1 and having saved data in blocks B0, B1, B2 can then access the memory and use for example blocks B250, B251 (by designating its initial password as password allocated to these blocks, by means of the index IDX) if other users have occupied blocks B3 to B249 in the meantime. Therefore, an embodiment of the present invention enables user data having different passwords to be interlinked.

As the zone PZ is arranged here in the system memory area SMEM, the password blocks SBi are designated by system addresses SAi (here SA1, SA2, SA3) that cannot be accessed by the user. According to one embodiment of the present invention, WRITE_PASSWORD and LOCK_PASSWORD commands are thus defined that are respectively dedicated to writing and to locking the passwords and which are executed by the control circuit CCT2. For these commands to be implemented, the password blocks SBi are designated by a block number NUMBi (here NUMB1, NUMB2, NUMB3) and the block number is converted into system address by the circuit CCT2.

Write Password Command

This command is used to write or refresh a password of 32 bits in one of the fields Pi of the zone PZ. After writing the block, the password must be activated by using the LOCK_PASSWORD command described below. According to the access rights defined by the parameter PR of the corresponding parameterization field PPi, it is possible to change the value of the password after a valid WRITE_PASSWORD command. This command comprises at least the code of the command, or $CODE_{wp}$, the number of the block targeted, or NUMBi, and the 32 bits of the password pwi (pw1, pw2, pw3) to be written. It is therefore in the following form:

[$CODE_{wp}$, NUMBi, pwi]

Lock Password Command

This command is provided for acting on the parameterization field PPi of the password blocks SBi. The bits b1 to b4 are concerned by this command, i.e., the parameter PR and the index IDX. After receiving this command, the lock bit b0 is automatically set to 1 by the circuit CCT2 to activate the control, by the parameter PR, of the access rights to the password, or to disable the password block targeted if the index IDX is equal to 0. After application of this command, the protection of the block as defined by the parameter PR is therefore activated and it is not possible to put the lock bit b0 back to 0. Thus, if the index IDX is taken to the value "00" or if the parameter PR is taken to the value "11", the corresponding password is definitively write-locked. This command comprises at least the code of the command or $CODE_{LP}$, the number of the password block targeted, or NUMBi, and the bits b1 to b4. It is therefore in the following form:

[$CODE_{LP}$, NUMBi, b1-b4]

A read command for reading the passwords can also be provided, so that the user can check the proper execution of the WRITE_PASSWORD command.

Furthermore, so as to facilitate the management of the access rights as defined by Table 4, a command for presenting the user password, or PRESENT_PASSWORD command, is advantageously provided by an embodiment of the present invention.

Present Password Command

This command is used to present a user password pwu to the control circuit CCT2 by indicating with which password pwi present in the zone PZ the password presented pwu must be compared. This command comprises at least the code of the command or $CODE_{pp}$, the number of the block containing the targeted password pwi, or NUMBi, and the password presented pwu. It is therefore in the following form:

[$CODE_{LP}$, NUMBi, pwu]

When the password presented corresponds to the targeted password, an access session is opened for the user for all the blocks having this password (i.e., the index of which IDX designates this password), the access rights to each block possibly being different however, according to the lock bit b0 or to the parameter PR of each block. Thus, it is not necessary for the user to present his password every time he sends a read or write command.

After executing this command, the result of the comparison between the target password pwi and the user password pwu is stored by the control circuit CCT2, for the entire duration of the session. Thus, the session is interrupted when the integrated circuit is switched off (which occurs, for example, when the integrated circuit is of passive type and is outside the polling range of a reader, from which its supply voltage is extracted). The session is also interrupted when the user presents a new password, by means of the PRESENT_PASSWORD command.

Similar commands can be provided for managing the parameterization fields PDi of the data blocks Bi. In particular, a LOCK_DATABLOCK command can be provided.

Lock Datablock Command

This command is provided for acting on the field PDi of the data blocks Bi. As above, the bits b1 to b4 are concerned by this command, i.e., the parameter PR and the index IDX. This command acts on the field PDi in the same way as the LOCK_PASSWORD command acts on the field PPi, and will not therefore be described in detail. This command comprises at least the code of the command or $CODE_{LD}$, the address Ai of the data block targeted in the memory UMEM, and the bits b1 to b4. It is therefore in the following form:

[$CODE_{LP}$, Ai, b1-b4]

Figure 3:
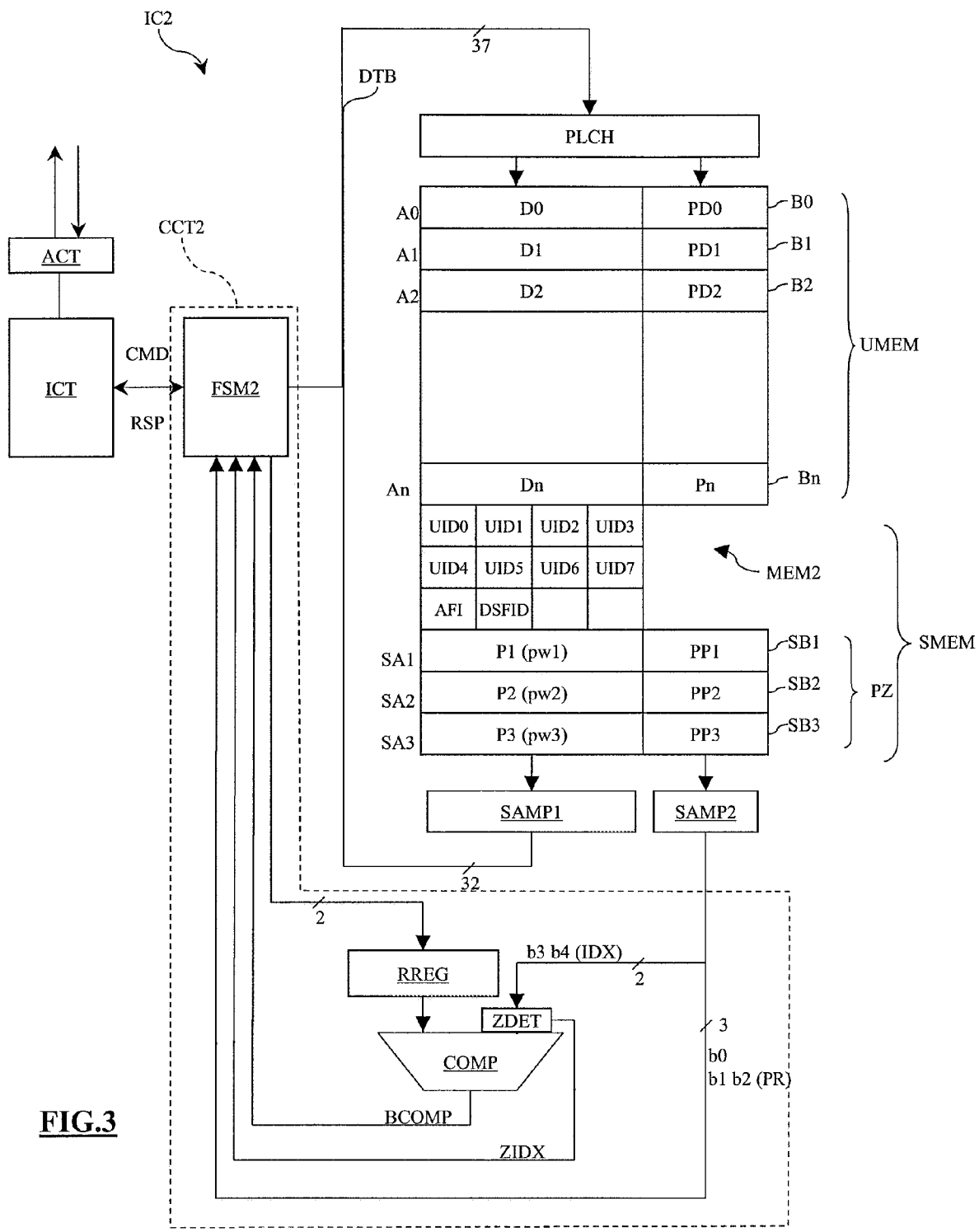
FIG. 3 represents an example of an embodiment of the integrated circuit in FIG. 2 in which the integrated circuit comprises a management circuit for managing the hard-wired logic memory, and represents certain elements of this management circuit.

FIG. 3 shows one embodiment of the circuit IC2 in which the control circuit CCT2 is produced in hard-wired logic. The core of the circuit CCT2 is a logic Finite State Machine FSM2 that is designed to execute read and write commands for reading and writing the memory and the specific commands described above. The memory MEM2 comprises a circuit PLCH one input of which is linked to a data bus DTB of 37 bits (32 bits for the data and 5 bits for the parameterization field) and one output of which is linked to the memory array of the memory MEM2, comprising a set of EEPROM-type memory cells arranged as a matrix. The circuit PLCH classically comprises programming latches and receives the data to be written in the memory. The memory MEM2 also comprises a first group of sense amplifiers SAMP1 to read the data fields Di or the password fields Pi, and a second group of sense amplifiers SAMP2 provided for reading the 5 bits of the parameterization fields PDi or PPi of the data blocks or of the password blocks. The memory also comprises an address decoder (word line decoder) enabling a block to be read- or write-selected, which has not been represented for the sake of legibility of the Figure.

The group SAMP2 thus supplies the bits b0 to b4 read in a block of the memory array. The bits b0 to b2 are sent to the logic machine FSM2 to be tested. The bits b3 and b4, forming the index IDX, are applied to a first input of a logic comparator COMP the second input of which receives the content of a reference register RREG controlled by the logic machine FSM2. The first input of the comparator COMP also comprises a zero detector ZDET that supplies a flag ZIDX that is equal to 1 when an index read in the memory is equal to 0(which means that the corresponding block has no allocated password).

The register RREG is used by the logic machine FSM2 to save an index IDX corresponding to a password validly presented by a user by means of the PRESENT_PASSWORD command.

Figure 4:
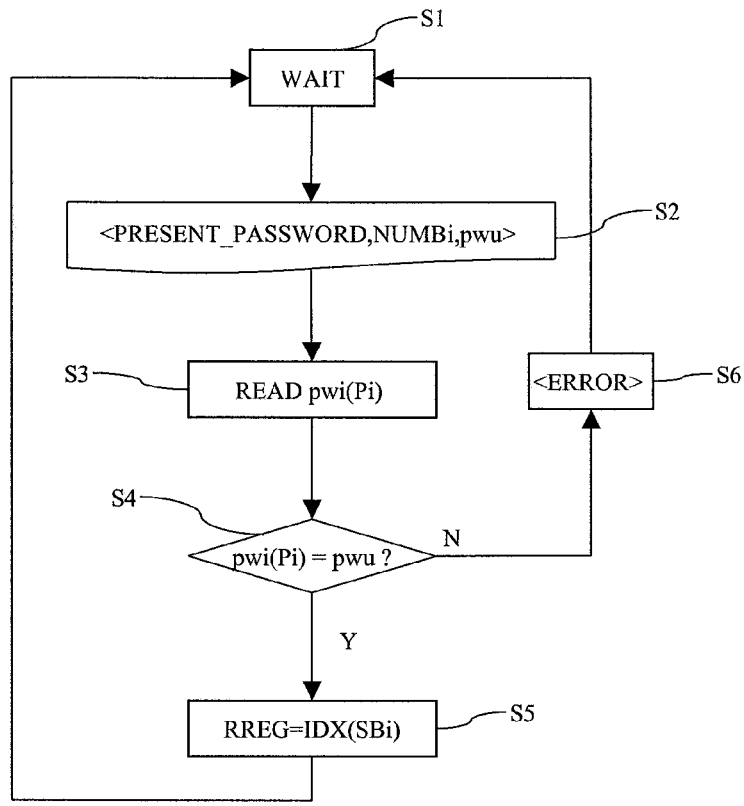
FIG. 4 is a flowchart describing one embodiment of the execution by the integrated circuit in FIG. 3 of a command for presenting a password.

This will be better understood by referring to the flow chart in FIG. 4, which succinctly describes an embodiment of the steps executed by the logic machine FSM2 to update the register RREG in response to a PRESENT_PASSWORD command. The following steps can be distinguished:

Step S1: WAIT
Step S2: <PRESENT_PASSWORD, NUMBi, pwu>
Step S3: READ pwi(Pi)
Step S4: pwi(Pi) = pwu ?
Step S5: RREG=IDX(SBi)
Step S6: <ERROR>

The step S1 is a step of waiting for a command. In step S2, the logic machine receives and decodes the PRESENT_PASSWORD command that comprises the number NUMBi of the password block targeted and the user password pwu. In step S3 the logic machine reads the password pwi(Pi) located in the field Pi of the password block SBi targeted by the block number NUMBi, i.e., the field Pi(SBi(NUMBi)). In step S4, the logic machine compares this password with the password pwu presented by the user. If the result of the comparison is positive, the logic machine goes to step S5 where it loads, into the register RREG, an index value IDX designating the password block SBi in question, according to the coding convention defined by Table 3 above. For example, if the block targeted by the command is the block SB1, the index loaded into the register is "01". In the opposite case, the logic machine goes to step S6 where it returns an error message via the interface circuit ICT.

After processing a PRESENT_PASSWORD command validly presented, the register RREG thus contains the index of the password block for which a password has been presented, which then enables the logic machine not to check, upon each read or write command received, whether or not the user has the password of the blocks to which he requests access: the user is considered to be authenticated if these blocks have the same index as the index stored in the register RREG, and is considered to not have presented the password if the blocks do not have the same index.

Figure 5A:
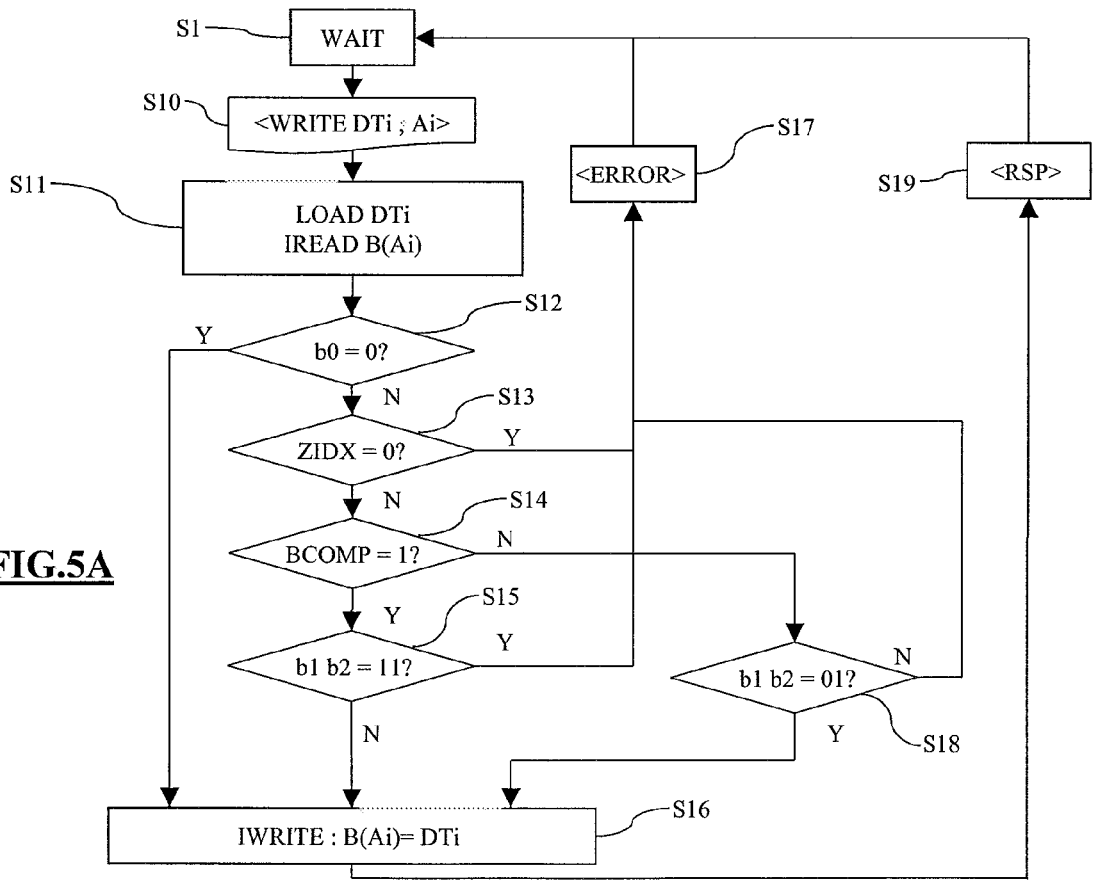
FIG. 5A is a flowchart describing one embodiment of the execution by the integrated circuit in FIG. 3 of a write command for writing a data block.

For a better understanding, FIG. 5A is a flowchart succinctly describing an embodiment of the steps executed by the logic machine to process a command for writing a data block, by using the register RREG. The following steps can be distinguished:

Step S1: WAIT
Step S10: <WRITE DTi; Ai>
Step S11: LOAD DTi and IREAD B(Ai)
Step S12: b0 = 0?
Step S13: ZIDX = 0?
Step S14: BCOMP = 1?
Step S15: b1 b2 = 11?
Step S16: IWRITE: B(Ai)= DTi
Step S17: <ERROR>
Step S18: b1 b2 = 01?
Step S19: <RSP>

After the wait step S1, the logic machine receives a write command for writing the datum DTi at the address Ai, i.e., in the data block Bi of address Ai. In step S11, the logic machine loads (LOAD) the data DTi into the circuit PLCH (FIG. 3) then carries out an internal reading (IREAD) of the address block Ai, i.e., the block B(Ai) (or block Bi according to the notation used above). The group of sense amplifiers SAMP2 then supplies the bits b0 to b4. The bits b3 and b4 (index IDX) are then applied to the input of the comparator COMP the output of which supplies a flag BCOMP that is equal to 1 if the comparison of the index IDX with the index loaded in the register RREG is positive. Furthermore, the flag ZIDX is equal to 0 if the index read is equal to "00".

The logic machine first determines, in step S12, whether or not the lock bit b0 is equal to 0. If b0=0, the targeted block can be accessed freely (refer to Table 4) and the logic machine goes to step S16 that is an internal write step (IWRITE) of writing in the targeted block B(Ai) the data received DTi, which are present in the circuit PLCH and ready to be saved in the memory array.

If the bit b0 is not equal to 0, the logic machine goes to step S13 where it determines whether or not the index is equal to 0 by observing the value of the flag ZIDX. If the flag ZIDX is equal to 0, and as the bit b0 is equal to 1, this means that no password has been declared for this block and that the block is write-locked (cf. Table 4). The logic machine then goes to step S17 where it returns an error message through the interface circuit ICT.

If the flag ZIDX is not equal to 0, the logic machine goes to step S14 where it determines whether or not the flag BCOMP is equal to 1. If the flag BCOMP is equal to 1, the logic machine goes to step S15 where it determines whether or not the bits b1 and b2 are equal to 1 (only case of write-locking the block when the signature has been presented, cf. Table 4).

If the bits b1 and b2 are equal to 1, the logic machine goes to step S17 and returns the error message. Otherwise, it goes to step S16 to execute the write command for writing the data DTi in the block B(Ai). If the flag BCOMP is equal to 0, this means that the user having sent the command has not previously declared the password allocated to the block. The logic machine then goes to step S18 to determine whether or not the bits b1 and b2 are respectively equal to 0 and to 1 (only case of authorizing writing of the block when the signature has not been presented, cf. Table 4). If the response is positive, the logic machine goes to step S16 to execute the write command for writing the data DTi in the block B(Ai). Otherwise, it goes to step S17 and returns the error message. After the write step, the logic machine goes through a step S19 where it returns a message RSP indicating that the writing has been carried out (optional step), and then returns to step S1.

Figure 5B:
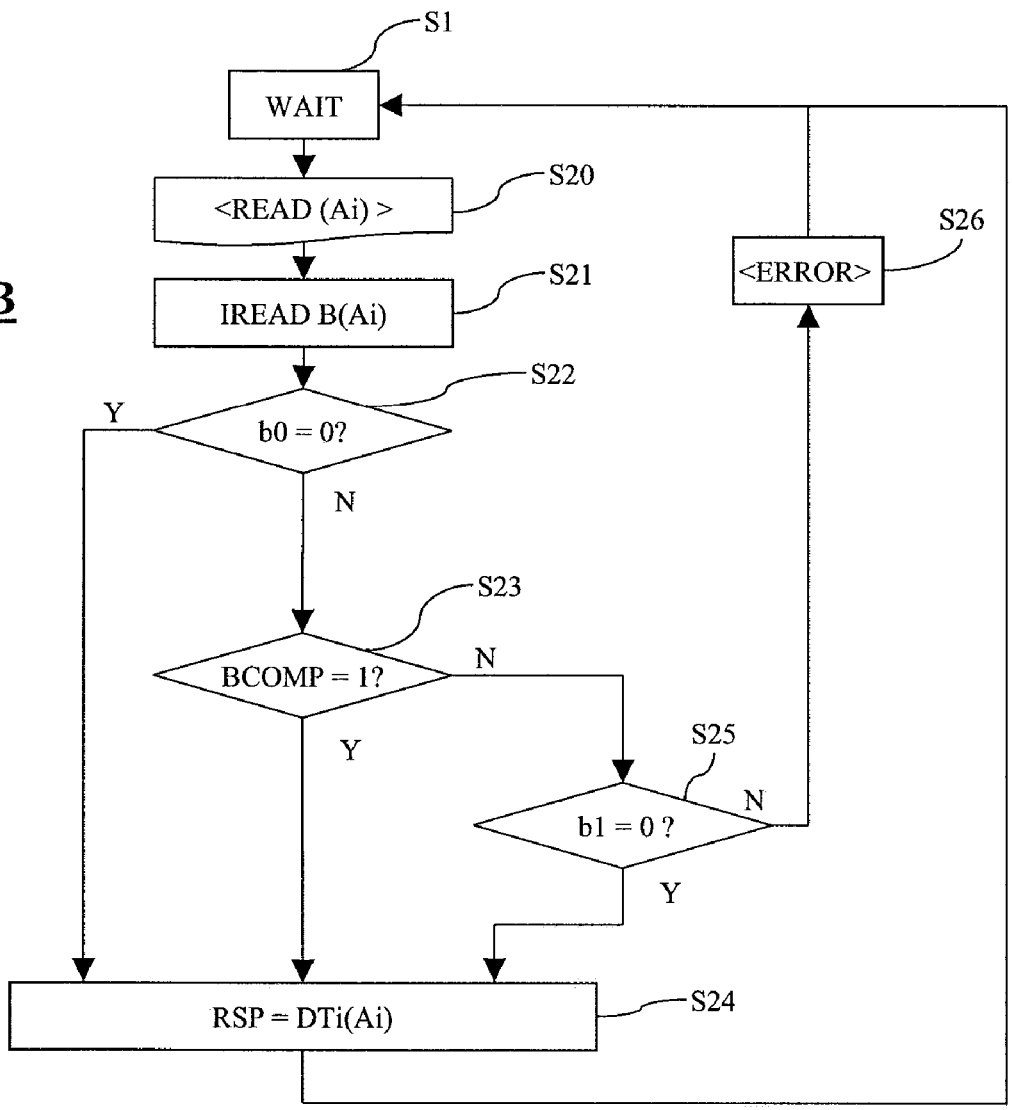
FIG. 5B is a flowchart describing one embodiment of the execution by the integrated circuit in FIG. 3 of a read command for reading a data block.

FIG. 5B is a flowchart succinctly describing an embodiment of the steps executed by the logic machine to process a read command for reading a data block, using the register RREG. The following steps can be distinguished:

Step S1: WAIT
Step S20: <READ (Ai)>
Step S21: IREAD B(Ai)
Step S22: b0 = 0?
Step S23: BCOMP = 1?
Step S25: b1 = 0?
Step S24: RSP = DTi(Ai)
Step S26: <ERROR>

In step S20, the logic machine receives a read command for reading a data block B(Ai) of address Ai. In step S21, it reads the data present in the block by means of the group of sense amplifiers SAMP1 and simultaneously reads the bits b0 to b4 by means of the group SAMP2. The bit b0 is tested in step S22. If b0 is equal to 0, the logic machine goes to step S24 and sends the data read DTi(Ai) in response to the command. If b0 is equal to 1, the logic machine determines during the step S23 whether or not the user has previously declared the password of the block by checking whether or not the flag BCOMP is equal to 1. If BCOMP is equal to 1, the logic machine goes to step S24 and sends the data read. If the bit BCOMP is equal to 0, the logic machine goes to step S25 where it determines whether or not the bit b1 is on b0. If the bit b1 is equal to 0, the logic machine goes to step S24 and sends the data read. Otherwise, it goes to step S26 to return an error message.

It will be understood by those skilled in the art that various alternative embodiments of the present invention are possible, such as concerning the coding of the parameterization field, the number of parameterization bits and the arrangement of the password blocks. The zone PZ containing the password blocks can particularly be arranged in the user memory UMEM and the password blocks are then accessible by using the read or write commands enabling the data blocks to be accessed. Furthermore, the use of several reference registers RREG and of several comparators COMP can enable several sessions with several passwords to be opened simultaneously. Moreover, the PRESENT_PASSWORD command can be provided without any indication of the target password block. In this case, the control circuit CCT2 itself searches, among the password blocks, whether there is at least one password corresponding to the password presented by the user.

Finally, although managing the access rights by using the parameter PR (bit b1, b2) and of the lock bit b0 was proposed above, all or part of these controls can be removed within the scope of applications in which the management of the accesses can be simplified. For a better understanding, Table 5 below describes a simplified management of the access rights to the data blocks without using the parameter PR. Table 6 below describes a simplified management of the access rights to the data blocks without using the lock bit b0. Table 7 below describes a simplified management of the access rights to the data blocks without using either the parameter PR or the lock bit b0. In this last alternative, the protection is of the "all or nothing" type without differentiating the read-access rights from the write-access rights. The user can only read- and write-access a block if he has the password designated by the index.

TABLE 5

Coding of the Fields PDi and PPi Without Parameter PR

| b0 | IDX | Password not presented | | Password presented | |
|----|-----|------------------------|---|--------------------|---|
|    |     | Read-accessible | Write-accessible | Read-accessible | Write-accessible |
| 0 | Xx | YES | YES | YES | YES |
| 1 | 00 | YES | NO | YES | NO |
| 1 | 01, 10, 11 | NO | NO | YES | YES |

TABLE 6

Coding of the Fields PDi and PPi Without Bit b0

| PR | IDX | Password not presented | | Password presented | |
|----|-----|------------------------|---|--------------------|---|
|    |     | Read-accessible | Write-accessible | Read-accessible | Write-accessible |
| xx | 00 | YES | YES | YES | YES |
| 00 | 01, 10, 11 | YES | NO | YES | YES |
| 01 | 01, 10, 11 | YES | YES | YES | YES |
| 10 | 01, 10, 11 | NO | NO | YES | YES |
| 11 | 01, 10, 11 | NO | NO | YES | NO |

TABLE 7

Coding of the Fields PDi and PPi Without Parameters PR and b0

| IDX | Password not presented | | Password presented | |
|-----|------------------------|---|--------------------|---|
|     | Read-accessible | Write-accessible | Read-accessible | Write-accessible |
| 00 | YES | NO | YES | NO |
| 01, 10, 11 | NO | NO | YES | YES |

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   managing access to a memory space shareable by several users, by using a plurality of passwords, the managing access including:
   defining a maximum number of passwords;
   providing a password storage zone;
   dividing the shareable memory space into a plurality of blocks greater in number than the maximum number of passwords;
   providing, in each block, a parameterization field to parameterize protection of the block;
   providing, in each parameterization field, a binary index smaller in size than the password and designating a password stored in the password storage zone that is assigned to the protection of the block, a same password possibly being used to protect several blocks; and
   allocating, to each block, access rights that enable access to the block if one of the several users presents a password that corresponds to the password designated by the index present in the block parameterization field, the allocating being performed by a configured control circuit of an integrated circuit.

2. The method according to claim 1, further comprising providing, in the parameterization field of each block, a first binary parameter defining the access rights to the block after presentation of a password corresponding to the password designated by the index, distinguishing between read- and write-access rights to the block.

3. The method according to claim 2 wherein the first binary parameter also defines access rights to the block without presentation of the password.

4. The method according to claim 2, further comprising providing, in the parameterization field of each block, a second binary parameter having a first value that authorizes the read- and write-access to the block whatever a value of the first binary parameter, and a second value that validates effects of the first binary parameter on the access rights to the block.

5. The method according to claim 1 wherein a value of the index includes an indication that no password is allocated to the block.

6. The method according to claim 4 wherein the block is write-locked when the second binary parameter has the second value and when the index indicates that no password is allocated to the block.

7. The method according to claim 1 wherein a total size of the parameterization field of a block is smaller than the size of a password.

8. The method according to claim 2 wherein write-access rights given to the parameterization field of a block are identical to the write-access rights that the parameterization field gives to the block in which it is situated.

9. The method according to claim 1, wherein the password storage zone comprises a plurality of password blocks each comprising a password field and a parameterization field defining the access rights to the password block.

10. The method according to claim 1, wherein the password storage zone is only accessible by using specific write commands to write the passwords.

11. The method according to claim 1, wherein the blocks of the shareable memory space are accessed by session, an opening of the session comprising:
presenting, from a user, a user password;
at least one comparing the password presented with at least one password present in the password storage zone; and
storing a result of the comparison, at least if this result is positive.

12. The method according to claim 11 wherein the session is interrupted if a new password is presented or if the memory space is switched off 13. The method according to claim 11 wherein:
storing of the result of the comparison of the passwords includes loading into a reference register a binary value equal to an index designating a password block; and
a processing of a request for read- or write-access to a block of the shareable memory space includes comparing the index present in the parameterization field of a targeted block with content of the reference register, the password of the block targeted by the request for access being considered to have been validly presented if a result of the comparison is positive.

14. An integrated circuit, comprising:
a memory and a control circuit to control access to the memory, the memory including a memory space shareable by several users, the control circuit including means for comparing passwords supplied by users and passwords present in the memory, wherein:
the memory includes a password storage zone defining a maximum number of passwords;
the memory space is divided into a plurality of blocks greater in number than the maximum number of passwords;
each block includes a parameterization field to parameterize protection of the block;
each parameterization field of a block includes a binary index smaller in size than a password and designating a password assigned to the protection of the block, a same password possibly being used to protect several blocks; and
the control circuit is arranged to allocate, to each block, access rights requiring a password to be presented that corresponds to the password designated by the index present in the block parameterization field.

15. The integrated circuit according to claim 14 wherein the parameterization field of each block further includes a first binary parameter defining the access rights to the block after presentation of a password corresponding to the password designated by the index, and distinguishing between read- and write-access rights to the block.

16. The integrated circuit according to claim 15 wherein the first binary parameter also defines access rights to the block without presentation of any password.

17. The integrated circuit according to claim 15 wherein the parameterization field of each block includes a second binary parameter having a first value that authorizes the read- and write-access to the block whatever a value of the first binary parameter, and a second value that validates effects of the first binary parameter on the access rights to the block.

18. The integrated circuit according to claim 14 wherein the index of each block can be taken to a value meaning that no password is allocated to the block.

19. The integrated circuit according to claim 17 wherein a block is write-locked if the second binary parameter has the second value and if the index indicates that no password is allocated to the block.

20. The integrated circuit according to claim 14 wherein a total size of the parameterization field of a block is smaller than the size of a password.

21. The integrated circuit according to claim 15 wherein write-access rights of the parameterization field of a block are identical to the write-access rights that the parameterization field gives to the block in which it is situated.

22. The integrated circuit according to claim 14 wherein the password storage zone includes a plurality of blocks each receiving a password and each including a parameterization field defining the access rights to the block.

23. The integrated circuit according to claim 14 wherein the password storage zone is arranged in a system area of the memory, and is only accessible to users by based on specific write commands to write the passwords.

24. The integrated circuit according to claim 14 wherein the blocks of the shareable memory space are accessed by session, the control circuit being arranged to execute a command to present a user password, and if the user password is identical to a password present in the password storage zone, to authorize the user to access the blocks, the index of which designates this password for an entire duration of the session, without requiring the password to be presented at each access to the blocks.

25. The integrated circuit according to claim 24 wherein the control circuit is arranged to interrupt a session if a new password is presented or if the integrated circuit is switched off.

26. The integrated circuit according to claim 24 wherein the control circuit is arranged to:
  upon receiving the command to present a password, compare the user password with a password present in a password block, and if the result of the comparison is positive, load into a reference register a binary value equal to an index designating the password block; and
  upon receiving a read or write command to read or write a block of the shareable memory space, compare the index present in the block targeted by the read or write command with content of the reference register, and consider that the password of the block targeted by the command has been validly presented if a result of the comparison is positive.

27. A system, comprising:
  a memory having a memory space that is shareable by several users and that can be divided into a plurality of blocks; and
  a control circuit coupled to the memory to control access to the memory, the control circuit including comparison circuitry to compare passwords supplied by users and passwords present in the memory, wherein:
  the memory includes a password storage zone that defines a maximum number of passwords that is less than a number of said blocks;
  each of said blocks including a respective parameterization field to parameterize protection of the respective block;
  each parameterization field of each respective block including a binary index that designates a password assigned to the protection of the respective block, a same password usable to protect several blocks; and
  the control circuit is arranged to allocate, to each block, access rights requiring a password to be presented that corresponds to the password designated by the index present in the parameterization field of each block.

28. The system of claim 27, further comprising:
  an antenna to receive said passwords wirelessly supplied by said users; and
  an interface circuit coupled to the antenna and to the control circuit to communicate the received passwords to the control circuit to allow the comparison circuitry to compare the received passwords with the passwords present in the memory.

29. The system of claim 27 wherein the parameterization of each block includes:
  a first binary parameter that defines the access rights to the block after presentation of a password corresponding to the password designated by the index, and distinguishing between read- and write-access rights to the block; and
  a second binary parameter having a first value that authorizes read- and write-access to the block, and a second value that validates effects of the first binary parameter on the access rights to the block, wherein the block is write-locked if the second binary parameter has the second value and if the index indicates that no password is allocated to the block.

30. The system of claim 27 wherein the blocks of the shareable memory space are accessible by session, the control circuit being arranged to execute a command to present a user password, and if the user password is identical to a password present in the password storage zone, to authorize user access to at least one of said blocks, the index of said at least one block designating this password for an entire duration of the session, without requiring the password to be presented at each access to the blocks.

31. The system of claim 30 wherein the control circuit is adapted to:
  upon receiving the command for presenting a password, compare the user password with a password present in a password block, and if the result of the comparison is positive, load into a reference register a binary value equal to an index designating the password block; and
  upon receiving a read or write command to read or write a block of the shareable memory space, compare the index present in the block targeted by the read or write command content of the reference register, and consider that the password of the block targeted by the command has been validly presented if a result of the comparison is positive.

32. A system for managing access to a memory space shareable by several users, by using a plurality of passwords, the system comprising:
  means for dividing the shareable memory space into a plurality of blocks greater in number than a maximum number of said passwords;
  means for providing, in each block, a parameterization field having a binary index present therein that designates a password assigned to the protection of the block, wherein a same one of said passwords may be used to protect several blocks;
  means for providing in each parameterization field the binary index smaller in size than the password, wherein the password is stored in a password storage zone; and
  means for allocating, to each block, access rights requiring a password to be presented that corresponds to the password designated by the index present in the parameterization field of the block.

33. The system of claim 32 wherein the parameterization of each block includes:
  first binary parameter means for defining the access rights to the block after presentation of a password corresponding to the password designated by the index, and means for distinguishing between read- and write-access rights to the block; and
  second binary parameter means having a first value for authorizing read- and write-access to the block, and a second value for validating effects of the first binary parameter means on the access rights to the block.

34. The system of claim 32 wherein the blocks of the shareable memory space are accessed by session, the system further comprising:
  means presenting, from a user, a user password;
  means for performing at least one comparison of the password presented with at least one password present in a password storage zone of the memory; and
  means for storing a result of the comparison, at least if this result is positive.

35. The system of claim 34 wherein said means for storing the result of the comparison of the passwords includes means for loading into a reference register a binary value equal to an index designating a password block, the system further comprising:
  means for processing of a request for read- or write-access to a block of the shareable memory space, including means for comparing the index present in the parameterization field of a targeted block with content of the reference register, the password of the block targeted by the request for access being considered to have been validly presented if a result of the comparison is positive.

* * * * *